(12) United States Patent
Kubsch et al.

(10) Patent No.: US 8,649,304 B2
(45) Date of Patent: Feb. 11, 2014

(54) OPTIMIZED SELECTION OF TRANSMISSION PROTOCOL RESPECTING THRESHOLDS

(75) Inventors: Stefan Kubsch, Hohnhorst (DE); Eduard Siemens, Sehnde (DE); Jens Brocke, Laatzen (DE); Andreas Matthias Aust, Hannover (DE); Ralf Koehler, Hannover (DE); Frank Glaeser, Hannover (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 12/737,298

(22) PCT Filed: Jun. 29, 2009

(86) PCT No.: PCT/EP2009/058116
§ 371 (c)(1),
(2), (4) Date: Dec. 28, 2010

(87) PCT Pub. No.: WO2010/000698
PCT Pub. Date: Jan. 7, 2010

(65) Prior Publication Data
US 2011/0096849 A1    Apr. 28, 2011

(30) Foreign Application Priority Data
Jul. 2, 2008    (DE) .................... 10 2008 030 939

(51) Int. Cl.
*H04B 1/44*    (2006.01)
(52) U.S. Cl.
USPC ........................................................ 370/282
(58) Field of Classification Search
None
See application file for complete search history.

(56) References Cited

U.S. PATENT DOCUMENTS

| | | | |
|---|---|---|---|
| 5,138,657 A * | 8/1992 | Colton et al. ............ 379/220.01 |
| 5,793,745 A * | 8/1998 | Manchester ................. 370/224 |
| 6,940,819 B2 | 9/2005 | Kato |
| 7,920,569 B1 * | 4/2011 | Kasturi et al. ............... 370/392 |
| 2001/0047421 A1 | 11/2001 | Sridhar et al. |
| 2004/0264377 A1 * | 12/2004 | Kilkki et al. ................. 370/235 |
| 2005/0136897 A1 | 6/2005 | Praveenkumar et al. |

(Continued)

FOREIGN PATENT DOCUMENTS

FR    2797543    2/2001

OTHER PUBLICATIONS

Dickens, P.M.; Larson, J.W.; Nicol, D.M.;, "Diagnostics for causes of packet loss in a high performance data transfer system," Parallel and Distributed Processing Symposium, 2004. Proceedings. 18th International, p. 55, Apr. 26-30, 2004.*

(Continued)

*Primary Examiner* — Dang Ton
*Assistant Examiner* — Ronald H Davis
(74) *Attorney, Agent, or Firm* — Tutunjian & Bitetto, P.C.

(57) ABSTRACT

In the method for management of data transmissions in a network, switching means are provided, by means of which a change can be carried out between a first data transmission type and a second data transmission type, as alternative data transmission types between a transmitter and a receiver. The change is carried out on the basis of at least one respectively predetermined criterion. The first data transmission type corresponds to a transport protocol based on rate-based overload control. The second data transmission type corresponds to a transport protocol based on RTT-based overload control.

15 Claims, 2 Drawing Sheets

(56) References Cited

U.S. PATENT DOCUMENTS

| | | | |
|---|---|---|---|
| 2005/0249214 A1* | 11/2005 | Peng | 370/392 |
| 2006/0259636 A1* | 11/2006 | Laakkonen et al. | 709/230 |
| 2007/0115848 A1* | 5/2007 | Chean et al. | 370/252 |
| 2008/0049638 A1* | 2/2008 | Ray et al. | 370/252 |
| 2008/0201751 A1* | 8/2008 | Ahmed et al. | 725/109 |
| 2008/0209033 A1* | 8/2008 | Ginter et al. | 709/224 |
| 2009/0285234 A1* | 11/2009 | McConnell et al. | 370/469 |

OTHER PUBLICATIONS

ITU-T Recommendation Q.764, "Signalling system No. 7—ISDN user part signalling procedures", ITU, Dec. 1999, pp. cover, 1-27 and 79-82.*

Wang et al., "ABRC: A End-to-End Rate Adaptation Scheme for Multimedia Streaming Over Wireless LAN", IEEE Communications Society, Hong Kong, 2004.

Search Report Dated Nov. 12, 2009.

* cited by examiner

OPTIMIZED SELECTION OF TRANSMISSION PROTOCOL RESPECTING THRESHOLDS

This application claims the benefit, under 35 U.S.C. §365 of International Application PCT/EP2009/058116, filed Jun. 29, 2009, which was published in accordance with PCT Article 21(2) on Jan. 7, 2010 in English and which claims the benefit of German patent application No. 10 2008 030 939.7, filed Jul. 2, 2008.

TECHNICAL FIELD

The invention relates to a method and an apparatus for management of data transmissions in a network.

BACKGROUND TO THE INVENTION

Modern network applications are widely used, and the quantities of data transferred between the individual network nodes are rising continuously with the progressive development of the various network applications. The video-on-demand (VoD) services as well as large file transfers for distributed simulations, such as grid computation applications, may be mentioned here as examples of network applications which require a wide bandwidth.

TCP (Transmission Control Protocol)-based data transmissions (using standard operating parameters) achieve a transmission rate of about 5 Mbit/s to 8 Mbit/s in a WAN environment. Recently, new protocols have been developed which allow high-speed data transmission at a transmission rate of about 1 Gbit/s, such as rate-based overload control protocols, which include FOBS (Fast Object-Based Data Transfer System) and FRTP (Fixed Rate Transport Protocol). These protocols allow high-bit-rate data transfer in networks with high bandwidth/delay products.

FIG. 1 shows a comparison of the throughput of rate-based overload control mechanisms using RTT (Round Trip Time)-based approaches (such as the TC protocol) for increasing data packet loss, on the basis of a first graph, in which the throughput is plotted on the ordinate, and the data packet loss is plotted on the abscissa, as percentages.

In the first graph, the dashed first lines L1, L1' relate to a data transfer for which a transport protocol based on rate-based overload control is used, while the solid first curve K1 relates to a data transfer using an RTT-based TCP protocol.

In the case of the graph L1, L1', the throughput is maintained even when the data packet loss rises. However, when the data packet loss exceeds a specific value, the data rate falls to zero. In contrast to the rate-based approach, the throughput falls continuously in the case of data transfers which use RTT-based overload control, such as the TCP protocol, although a low throughput can be achieved even with a high data packet loss or long RTT delays.

FIG. 2 shows a second graph, in which the throughput is chosen as the ordinate, and the RTT delay as the abscissa. In the second graph, the dashed second lines L2, L2' relate to a data transfer for which a transport protocol based on rate-based overload control is used, while the solid second curve K2 relates to a data transfer by means of an RTT-based TCP protocol.

The graphs in both FIGS. 1 and 2 are similar.

As is evident from the embodiments described above, the current network protocols for distributed applications are capable of further development with regard to the requirements placed on them. On the one hand, rate-based overload control approaches allow high-speed data transmissions with a high throughput up to a specific threshold value, where the data rate collapses. On the other hand, transport protocols which are based on rate-based overload control do not allow high throughput rates, but offer reliable data transmissions even in the event of a high data packet loss or a long RTT delay.

INVENTION

The object of the present invention is now to provide a method, which is optimized in comparison to the prior art, and an apparatus for carrying out the method, while overcoming the disadvantage described above. This object is achieved by a method having the features of claim 1 and by an apparatus having the features of claim 12. Advantageous embodiments of the invention are defined in further claims.

In the method for management of data transmissions in a network, switching means are provided, by means of which a change can be carried out between a first data transmission type, for which a transport protocol based on rate-based overload control is used, and a second data transmission type, for which an RTT-based overload control protocol is used, as alternative data transmission types between a transmitter and a receiver. In this case, the change is carried out on the basis of at least one respectively predetermined criterion. By way of example and not restrictively, the network is a LAN (Local Area Network) or a WAN (Wide Area Network). In particular, a distinction is drawn between the transmission types on the basis of the protocols used in the transport layer and/or network layer. In one refinement of the method according to the invention, the second data transmission type is a TCP link.

According to one embodiment variant of the method according to the invention, while one of the two data transmission types is being used, a monitoring device detects and assesses at least one characteristic variable of the network. A decision is made in this case to change from the transmission type currently being used to the respective other transmission type on the basis of the assessment of the characteristic variable.

In one refinement of the method according to the invention, the characteristic variable is the data rate. Any variable from which the data rate can be derived may, of course, also be used as a characteristic variable.

In one embodiment of the method according to the invention, the characteristic variable is the RTT delay. Any variable from which the RTT delay can be derived may, of course, also be used as the characteristic variable.

In a further embodiment of the method according to the invention, the characteristic variable is the data packet loss. Any variable from which the data packet loss can be derived may, of course, also be used as the characteristic variable.

In one refinement of the method according to the invention, a change from the first data transmission type to the second data transmission type is initiated when the value of the characteristic variable exceeds a predetermined first threshold value, while a change from the second data transmission link to the first data transmission type is initiated when the value of the characteristic variable falls below a second threshold value.

By way of example, the transmitter and the receiver communicate with one another using a signalling procedure. In this case, the signalling procedure comprises the transmission of a change initialization message from the transmitter to the receiver. The change initialization message signals to the receiver that a change must be initiated from the currently used data transmission type to the respective other data transmission type.

By way of example, the transmitter and the receiver negotiate at least one of the threshold values with one another, with the change being carried out automatically.

In the interest of improving the reliability of the signalling procedure and thus, in the end, of the method according to the invention, it is advantageous if the signalling procedure comprises acknowledgement of the change initialization message by the receiver.

In order to create the precondition for the transmitter and the receiver to be able to "negotiate" the relevant threshold values with one another in the specific sense, and to carry out the change between the transmission types without the use of explicit signalling, in one embodiment variant of the method according to the invention, after reaching the first threshold value, the receiver is caused to monitor the second data transmission type and to periodically check new data packets. In this case in which the receiver is caused to switch to the second data transmission type after reception of the first data packet transmitted by means of the second data transmission type and after reception of the last data packet transmitted by means of the first data transmission type. The switching from the second data transmission type after reaching the second threshold value $th_2$ is carried out analogously to the procedure described above.

Inter alia, the invention has the advantage that, when the current network conditions are poor, a minimum performance level is guaranteed by changing to the second data transmission type, with this minimum performance being that which is required in order to complete the data transmission in a reliable manner.

DETAILED DESCRIPTION OF THE INVENTION

Further advantages and details of the method according to the invention will be described in the following text with reference to the attached FIGS. 3 to 5.

Figure 1:
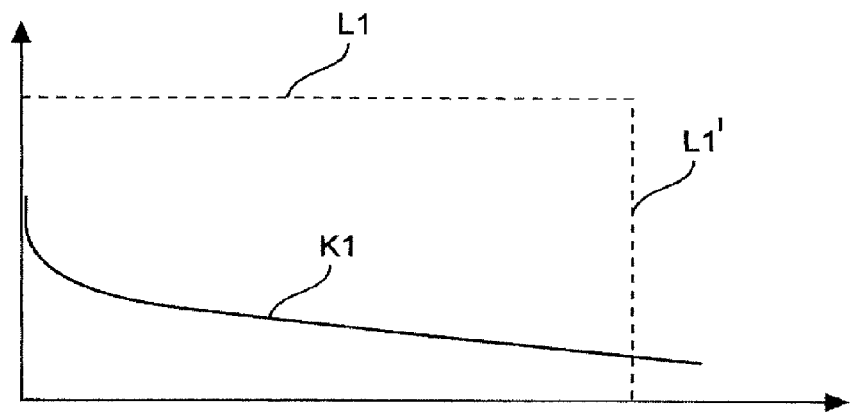
FIG. 1 shows a first graph, in which the throughput is plotted against the data packet loss.
Figure 2:
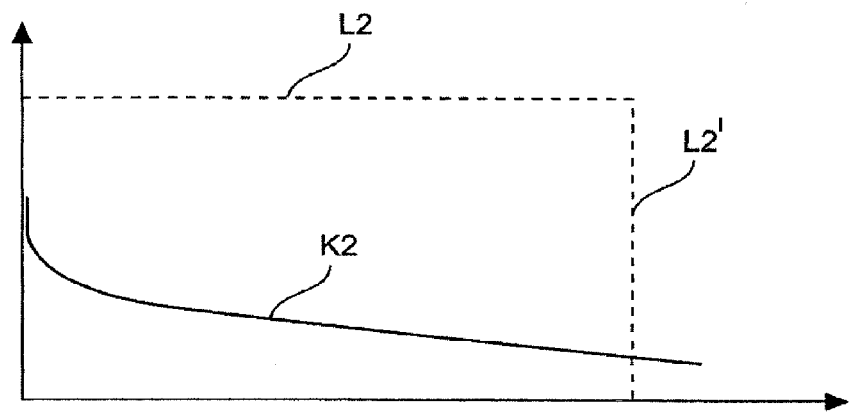
FIG. 2 shows a second graph, in which the throughput is plotted against the RTT delay.
Figure 3:
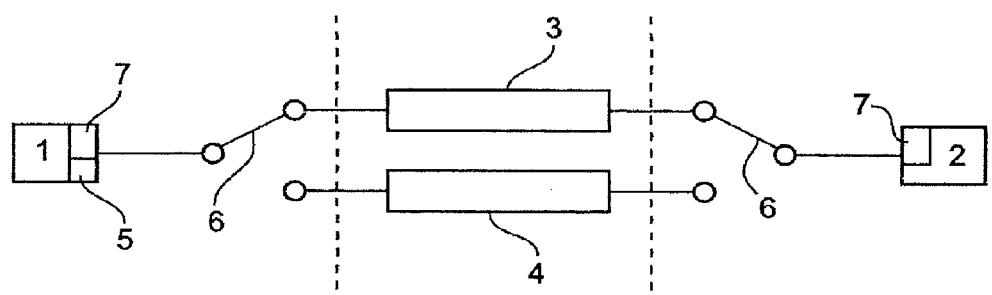
FIG. 3 shows a block diagram in order to illustrate the method according to the invention.

The block diagram shown in FIG. 3 illustrates a transmitter 1 and a receiver 2 within a network, for example a LAN or WAN. A high-speed data transmission link 3, for which a transport protocol based on rate-based overload control is used, as well as a backup TCP link 4 are set up as alternative data transport mechanisms between the transmitter 1 and the receiver 2.

On the basis of the situation illustrated in FIG. 3, a high-speed data transmission link 3, for which the UDP (User Datagram Protocol) is used, currently exists between the transmitter 1 and the receiver 2.

A first data packet loss threshold value $th_1$ and a second data packet loss threshold value $th_2$ are defined in advance for the data packet loss.

In addition to the data packet loss threshold values $th_1$, $th_2$, a first RTT delay threshold value $th_3$ and a second RTT delay threshold value $th_4$ can be defined in advance, and the method according to the invention can be carried out on the basis of the combined use of all four threshold values $th_1$, $th_2$, $th_3$ and $th_4$.

However, in order to simplify the description, the following description is limited to consideration of one method according to the invention using only the data packet loss threshold values $th_1$, $th_2$.

Throughout the entire duration of the data transmission, the network conditions are periodically monitored for the predetermined data packet loss threshold values $th_1$, $th_2$ by means of a monitoring device 5 which is provided, for example, in the transmitter 1. If the network conditions deteriorate, the measured data packet loss will exceed the predetermined data packet loss threshold value $th_1$. The monitoring device 5 identifies that the first data packet loss threshold value $th_1$ has been exceeded and then first of all causes the transmitter 1 to use a signalling message to signal to the receiver 2 that, starting with a defined first data packet sequence number, a change must be initiated to the backup TCP link from the currently used high-speed data transmission link 3, which uses the UDP protocol. The transmitter 1 waits for an acknowledgement of the relevant signalling message from the receiver 2 and, after acknowledgement has been received, sends data, starting with the defined first data packet sequence number, via the backup TCP link 4. Switching means 6 are provided for this purpose, which may also be in the form of software and may be part of the transmitter 1 and of the receiver 2. Signalling means 7 which can interchange appropriate messages using a protocol, are likewise provided in the transmitter 1 and the receiver 2. When the network conditions improve again, the measured data packet loss will finally fall below the predetermined second data packet loss threshold value $th_2$. The monitoring device 5 identifies that the second data packet loss threshold value $th_2$ has been undershot, and the transmitter 1 then uses a further signalling message to signal to the receiver 2 that a change must be made from a defined second data packet sequence number from the backup TCP link 4 back to the high-speed data transmission link 3, for which a transport protocol based on rate-based overload control is used. After the reception of an acknowledgement, transmitted by the receiver 2, of the relevant signalling message, the transmitter 1 uses the switching means 6 to transmit via the high-speed data transmission link 3, starting with the defined second sequence number.

Figure 4:
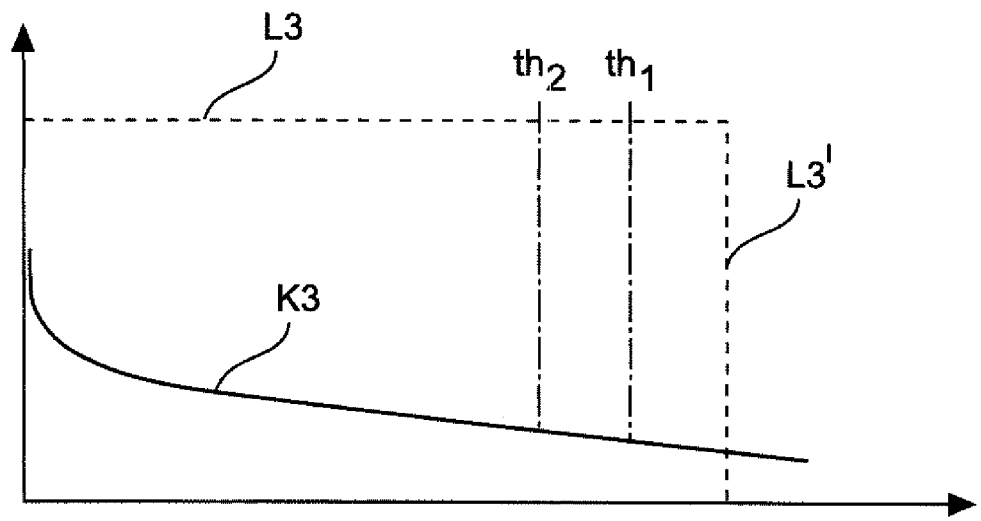
FIG. 4 shows a third graph, in which the throughput is plotted against the data packet loss, and a first threshold value and a second threshold value are shown.

In FIG. 4, the data packet loss threshold values $th_1$ and $th_2$ are shown on a third graph, in which the throughput is plotted against the data packet loss.

In the third graph, the dashed third lines L3, L3' relate to the high-speed data transmission link 3, while the solid third curve K3 relates to the backup TCP link 4.

Figure 5:
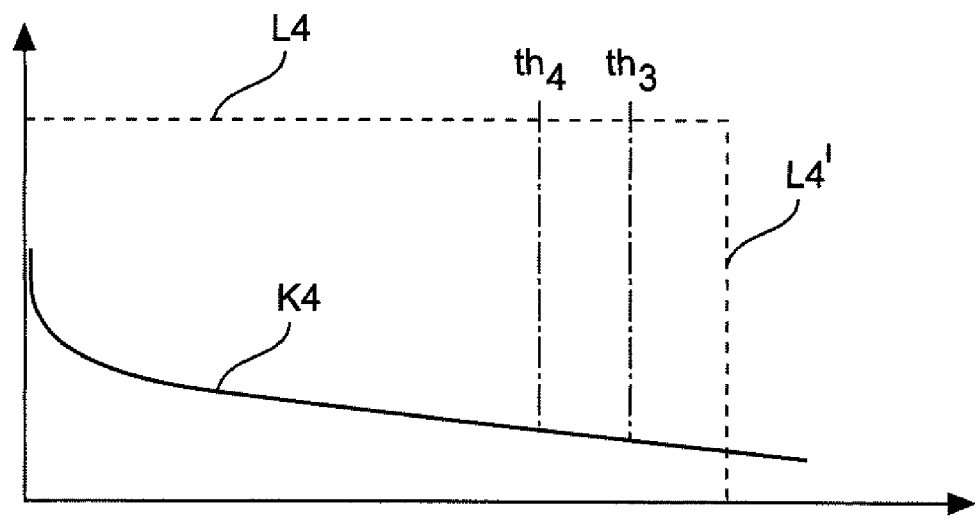
FIG. 5 shows a fourth graph, in which the throughput is plotted against the RTT delay, and a third threshold value and a fourth threshold value are shown.

In FIG. 5, the RTT delay threshold values $th_3$ and $th_4$ are shown on a fourth graph, in which the throughput is plotted against the RTT delay.

In the fourth graph, the dashed fourth lines L3, L3' relate to the high-speed data transmission link 3, while the solid third curve K3 relates to the backup TCP link 4.

The invention discloses a way to provide a TCP backup mechanism for data transmissions based on rate-based overload control. This TCP backup mechanism always and in every case allows the completion of a data transmission in which the TCP protocol is used.

Alternatively, the monitoring means 5 may also be located in the receiver 2, or else may be distributed between the transmitter 1 and the receiver 2. If contained in the transmitter 2, a checking capability is required for the transmitter 2. This can be done by appropriate messages based on the respective transmission protocol.

The invention claimed is:

1. Method for management of data transmissions in a network, comprising:
providing switching means, wherein the switching means switches on the basis of at least one respectively predetermined criterion between a first data transmission link, for which a transport protocol based on rate-based overload control is used, and a second data transmission link, for which a second transport protocol based on round trip time (RTT)-based overload control protocol is used, as alternative data transmission links between a transmitter and a receiver;
detecting and assessing at least one characteristic variable of the network at a monitoring device while one of the two data transmission links is used;
switching from an in-use transmission link to an inactive transmission link based on said assessment, wherein a switch from the first link to the second link is initiated when the value of the characteristic variable exceeds a predetermined first threshold value and wherein a switch from the second link to the first link is initiated when the value of the characteristic variable falls below a predetermined second threshold value, wherein the second link is monitored after the characteristic variable exceeds the first threshold value, with the switch to the second link being initiated after reception of a first data packet transmitted by means of the second link and after reception of a last data packet transmitted by means of the first link.

2. Method according to claim 1, wherein the second data transmission link is a TCP link.

3. Method according to claim 1, wherein the characteristic variable is an applicable data rate.

4. Method according to claim 1, wherein the characteristic variable is an RTT delay.

5. Method according to claim 1, wherein the characteristic variable is a data packet loss.

6. Method according to claim 1, wherein a change from the first data transmission link to the second data transmission link is initiated when the value of the characteristic variable exceeds a predetermined first threshold value, and in that a switch from the second data transmission link to the first data transmission link is initiated when the value of the characteristic variable falls below a predetermined second threshold value.

7. Method according to claim 1, wherein the transmitter and the receiver communicate with one another using a signalling procedure, with the signalling procedure comprising the transmission of a change initialization message from the transmitter to the receiver, with the change initialization message signalling to the receiver that a change must be initiated from the currently used data transmission link to the respective other data transmission link.

8. Method according to claim 7, wherein the signalling procedure comprises acknowledgement of the change initialization message by the receiver.

9. Method according to claim 1, wherein the transmitter and the receiver negotiate at least one of the threshold values with one another, and the negotiation between the transmitter and the receiver is carried out automatically.

10. Apparatus for management of data transmissions in a network, comprising:
a switching means configured to switch on the basis of at least one respectively predetermined criterion, between a first data transmission link, for which a first transport protocol based on rate-based overload control is used, and a second data transmission link, for which a second transport protocol based on a round trip time (RTT)-based overload control protocol is used, as alternative data transmission links between a transmitter and a receiver;
a monitoring device configured to detect and assess at least one characteristic variable of the network while one of the two data transmission links is used; and
wherein the switching means is further configured to switch from an in-use transmission link to an inactive transmission link based on said assessment, wherein a switch from the first link to the second link is initiated when the value of the characteristic variable exceeds a predetermined first threshold value and wherein a switch from the second link to the first link is initiated when the value of the characteristic variable falls below a predetermined second threshold value, wherein the second link is monitored after the characteristic variable exceeds the first threshold value, with the switch to the second link being initiated after reception of a first data packet transmitted by means of the second link and after reception of a last data packet transmitted by means of the first link.

11. Apparatus according to claim 10, wherein the monitoring device makes a decision to switch from the data transmission link currently used to the respective other data transmission link on the basis of the assessment.

12. Apparatus according to claim 10, further comprising signalling means configured to carry out a first signalling procedure, in the course of which the transmitter and the receiver communicate with one another, with the first signalling procedure comprising the transmission of a change initialization message from the transmitter to the receiver, with the change initialization message signalling to the receiver that a change must be initiated from the currently used data transmission links to the respective other data transmission link.

13. Apparatus according to claim 12, wherein the signalling means carry out a second signalling procedure which comprises acknowledgement of the change initialization message by the receiver.

14. Apparatus according to claim 10, wherein the receiver monitors the second data transmission link after reaching a first threshold value and to periodically check new data packets, and in that the receiver switches to the second data transmission link after reception of the first data packet transmitted by means of the second data transmission link and after reception of the last data packet transmitted by means of the first data transmission link.

15. Apparatus for management of data transmissions in a network, comprising:
a switching means configured to switch on the basis of at least one respectively predetermined criterion, between a first data transmission link, for which a first transport protocol based on rate-based overload control is used, and a second data transmission link, for which a second transport protocol based on a round trip time (RTT)-based overload control protocol is used, as alternative data transmission links between a transmitter and a receiver;

a monitoring device configured to detect and assess at least one characteristic variable of the network while one of the two data transmission links is used; and wherein the switching means is further configured to switch from an in-use transmission link to an inactive transmission link based on said assessment, wherein a switch from the first link to the second link is initiated when the value of the characteristic variable exceeds a predetermined first threshold value and wherein a switch from the second link to the first link is initiated when the value of the characteristic variable falls below a predetermined second threshold value, wherein the second link is monitored after the characteristic variable exceeds the first threshold value, with the switch to the second link being initiated after reception of a first data packet transmitted by means of the second link and after reception of a last data packet transmitted by means of the first link; and monitor the second data transmission link and to periodically check new data packets, wherein the receiver switches to the second data transmission link after reception of the first data packet transmitted by means of the second data transmission link and after reception of the last data packet transmitted by means of the first data transmission link.

\* \* \* \* \*